United States Patent [19]

Eckert

[11] 4,228,903
[45] Oct. 21, 1980

[54] GRAVITY FEED CAN DISPENSER FOR BEVERAGE COOLERS

[75] Inventor: Ronald P. Eckert, Northbrook, Ill.

[73] Assignee: Thomas A. Schutz Co., Inc., Morton Grove, Ill.

[21] Appl. No.: 33,721

[22] Filed: Apr. 26, 1979

[51] Int. Cl.³ .......................... A47F 5/01; B65G 11/00
[52] U.S. Cl. .................................. 211/49 D; 193/2 D; 206/45.16; 211/194
[58] Field of Search ...................... 211/49 D, 126, 194; 206/45.16; 193/2 R, 2 D; 312/45, 42

[56] References Cited

U.S. PATENT DOCUMENTS

| | | | |
|---|---|---|---|
| 2,852,327 | 9/1958 | Mason | 312/45 |
| 2,915,162 | 12/1959 | Umstead | 193/27 |
| 3,603,452 | 9/1971 | Singer | 206/45.16 |
| 3,704,792 | 12/1972 | Wise | 211/126 |
| 4,105,126 | 8/1978 | Deffner et al. | 211/49 D |

OTHER PUBLICATIONS

Popai 18th Annual Merchandising Awards, 1977 Winners Directory, published by Point of Purchase Advertising Institute, N.Y., N.Y., p. 27.

Primary Examiner—Robert B. Reeves
Assistant Examiner—Gene A. Church
Attorney, Agent, or Firm—Wegner, Stellman, McCord, Wiles & Wood

[57] ABSTRACT

A gravity feed can dispenser for use in a commercial cooler is provided with integral means permitting two or more dispensers to be stacked in interlocked relationship, and further integral means permitting two dispensers to be connected side by side. The racks in most coolers are formed of parallel wires extending from front to rear; and in order that a dispenser may be stably supported on such a rack there must be transversely extending feet that rest upon several rack wires. In the present structure there is a fixed foot at the front which is vertically small enough that on an upper dispenser of a stack it does not interfere with removal of a can from the dispenser beneath it; and there is a hinged panel toward the rear which selectively occupies a non-interference position if the dispenser is an upper one, or a supporting position if the dispenser rests directly upon the rack.

14 Claims, 6 Drawing Figures

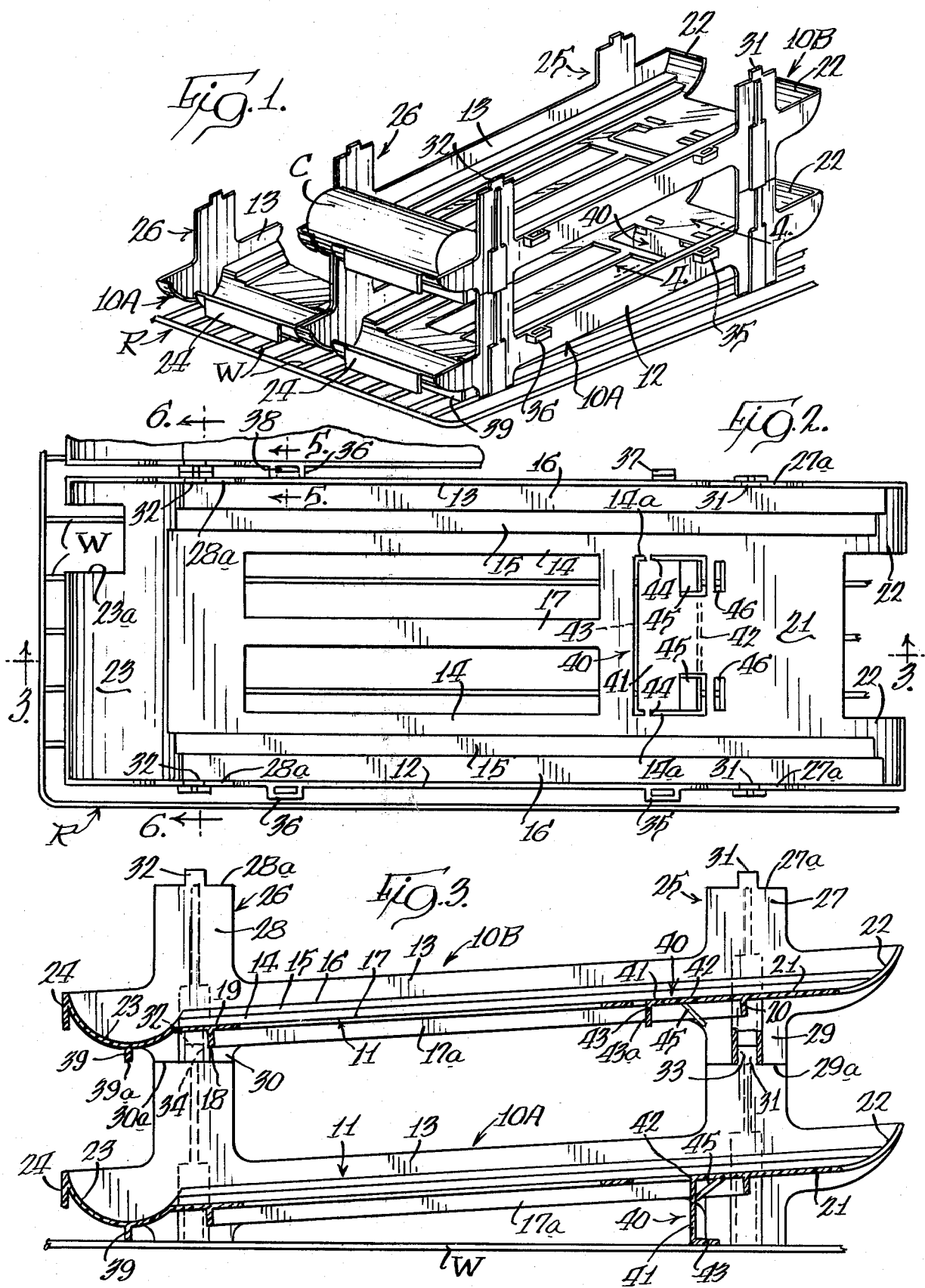

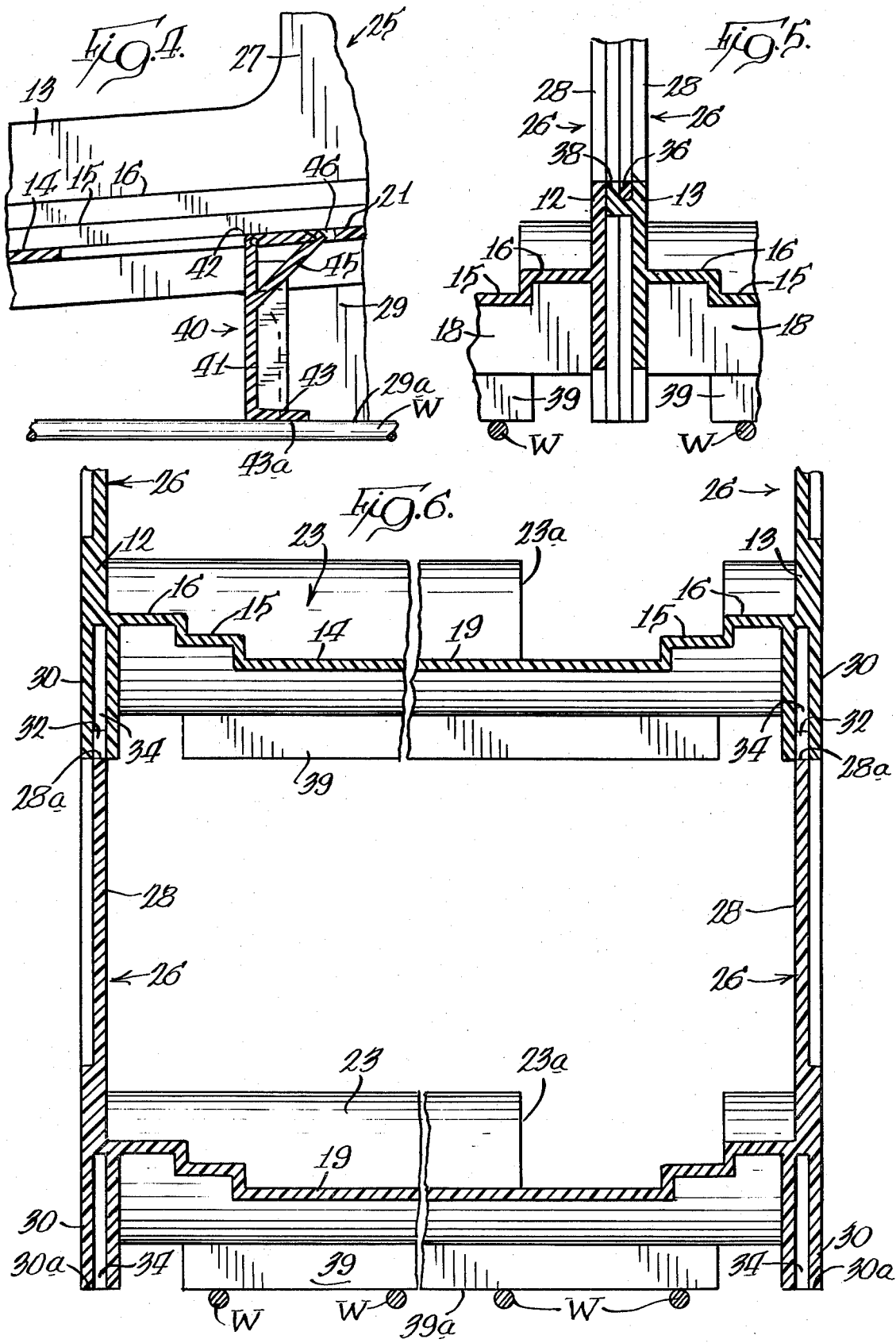

GRAVITY FEED CAN DISPENSER FOR BEVERAGE COOLERS

BACKGROUND OF THE INVENTION

There are many retail outlets which sell single cans of products, such as beverages, which the customer wishes to purchase chilled for immediate consumption. Orderly storage of such canned products in a commercial cooler is difficult because of the many varieties of products that must be readily available to customers, and also because of the need for replenishing supplies of each product as they are purchased. The replenishment problem has been greatly simplified by making commercial coolers that are loaded from the rear and emptied from the front; but this does not simplify the orderly display of products in the cooler.

A number of gravity feed dispensers have been developed which can be used in a commercial cooler; but most of them are multi-level structures which, while they may be shipped in knocked down form, do not consist of units which can be stacked to the extent permitted by the vertical space between racks in the cooler. Reference is here made to Mason U.S. Pat. No. 2,852,327 and Umstead U.S. Pat. No. 2,915,162. Reference is also made to a gravity feed beverage can dispenser illustrated at page 27 of the POPAI Eighteenth Annual Merchandising Awards 1977 Winners Directory, published by Point of Purchase Advertising Institute, 60 East 42nd Street, New York, N.Y. 10017.

A stackable knock-down display is disclosed in Wiese U.S. Pat. No. 3,704,792.

There are a number of factors that complicate the problem of designing a satisfactory gravity feed can dispenser for use in commercial coolers. A first consideration is to make the dispenser as compact as possible, consistent with making it easy to load and unload, and capable of handling the three different sizes of cans that are used for beverages, which represent the vast majority of all products displayed and sold from commercial coolers.

Another factor is that nearly all the racks used in commercial coolers consist of parallel wires that extend from front to rear of the cooler. This means that a can dispenser which is made with thin side walls to save cooler space cannot be supported stably upon the racks because the thin side walls fall between the wires. At the same time, transverse supports on the bottom of a dispenser are unsatisfactory if the dispenser is to be an upper unit of a stack, because the transverse supports project into the space which must be kept unobstructed for the travel of cans down the next lower dispenser in the stack.

SUMMARY OF THE INVENTION

In accordance with the present invention, a stackable gravity feed can dispenser has a downwardly and forwardly inclined guideway the sides of which are defined by side walls that have integral, upright supporting webs near the rear and front which are thinner than the space between wires of a cooler rack. The guideway is downwardly and forwardly inclined to support a series of cans for seriatim rolling movement from a filling end of the guideway at the rear of the cooler to a delivery end at the front of the cooler. The supporting webs have upper ends above the plane of the guideway which have upper inter-engaging means and lower ends below the plane of the guideway which have lower inter-engaging means complementary to the upper inter-engaging means, so that two of the dispensers may be stacked one upon the other with the upper and lower means inter-engaged. When stacked, the webs leave an unobstructed space for cans in the lower dispenser. In order that the lowermost dispenser in a stack may be stably supported upon the wire rack of a cooler, there is a depending, transversely elongated rack-engaging foot adjacent the front of the guideway which is adapted to rest upon several of the rack wires; and the foot is vertically short enough to avoid interference with removal of cans when a dispenser is the upper of two dispensers. Hinged panel means near the rear of the guideway has a non-interference position entirely outside the unobstructed space, and has a supporting position in which a lower surface rests stably upon several rack wires. Thus, when a dispenser is not the lowermost dispenser in a stack the hinged panel means is left in the non-interference position; while the panel means of the lowermost dispenser is moved to supporting position.

In a preferred embodiment the guideway is molded from a polypropylene of the type which can be molded to form an integral hinge, and the hinge is formed integrally with the bottom of the guideway. Integral frangible tabs connect the free end portion of the panel means to the guideway so as to hold the panel means normally in the non-interference position; and the frangible tabs are broken only on a dispenser which is to be at the bottom of the stack.

Further, a preferred embodiment also includes integral external eyes on one side wall of the dispenser and integral external hooks on the other side wall, so that the hooks on one dispenser may be engaged with the eyes on a laterally abutting dispenser to stably interconnect the dispensers side by side.

DRAWINGS

FIG. 1 is a perspective view of two stacked can dispensers embodying the present invention, with a part of a third dispenser also illustrated;

FIG. 2 is a plan view on an enlarged scale, illustrating one can dispenser and a part of a second which is above it in the drawing;

FIG. 3 is a sectional view taken substantially as indicated along the line 3—3 of FIG. 2;

FIG. 4 is a fragmentary sectional view on an enlarged scale taken substantially as indicated along the line 4—4 of FIG. 1;

FIG. 5 is a fragmentary sectional view on the same scale as FIG. 4, taken substantially as indicated along the line 5—5 of FIG. 2; and FIG. 6 is a fragmentary sectional view on an enlarged scale taken substantially as indicated along the line 6—6 of FIG. 2.

DETAILED DESCRIPTION OF THE INVENTION

Referring to the drawings in detail, a commercial cooler has a rack R which is formed of parallel wires W that extend from front to rear of the cooler. As seen in FIG. 1, a lower dispenser 10A rests upon the rack R, and an upper dispenser 10B is stacked upon the rack 10A and interlocked therewith. A third dispenser, also indicated as 10A, rests upon the rack R and is interlocked with the first dispenser 10A. As is apparent from the drawings, the only difference between the dispensers 10A and the dispenser 10B is in the different selective positioning of the hinged panels on the dispensers 10A as compared with that on the dispenser 10B, as will be described in detail hereinafter. Accordingly, like parts on the dispensers 10A and 10B are given the same reference numerals.

Referring now particularly to FIG. 3, a dispenser 10 consists of a downwardly and forwardly inclined guideway, indicated generally at 11, the sides of which are defined by a side wall 12 and a side wall 13. As best seen in FIGS. 3 and 6, the guideway 11 has stepped supporting surfaces along its two sides which define guides 14, 15 and 16 which are at three different levels and of three different widths to receive and guide cans of different sizes.

In addition to the lowermost of the three supporting surfaces, the guide 14 includes a longitudinal, central T-bar 17 having a depending rib 17a which joins with a front cross rib 18 that reinforces a front floor portion 19 of the guide 14. A rear cross rib 20 reinforces a rear floor 21 of the guide 14.

A pair of arcuate infeed guide surfaces 22 at the rear of the dispenser simplify the insertion of cans into the guideway; and a transverse arcuate trough 23 having a finger recess 23a near the side wall 13 facilitates removal of a can from the guideway. A transverse plate 24 which is integral with the front of the trough 23 provides a surface to receive a label for identifying the product which is in the dispenser. A can C is in the trough 23 of the upper unit 10B.

The side walls 12 and 13 are best seen in FIG. 3 to have integral upright supporting webs, indicated generally at 25, near the rear of the dispenser; and integral upright supporting webs, indicated generally at 26, near the front of the dispenser. The upright supporting webs 25 and 26 are best seen in FIG. 6 to be the same thickness as the side walls 12 and 13, and that thickness is seen to be considerably less than the space between parallel wires W of a rack R. Making the walls and the upright webs as thin as is consistent with adequate strength of the dispenser permits the largest possible number of such dispensers to be placed side by side in a cooler.

The supporting webs 25 and 26 have respective upper end portions 27 and 28 above the guideway 11, and respective lower end portions 29 and 30 below the guideway. The upper end portions 27 and 28 have coplanar upper ends 27a and 28a, which are provided with respective upper inter-engaging means 31 and 32. The web lower end portions 29 and 30 have respective coplanar lower ends 29a and 30a; and formed in the respective lower end portions 29 and 30 are lower inter-engaging means 33 and 34 which are complementary to the upper inter-engaging means 31 and 32. Thus, when two dispensers are stacked the upper dispenser 10B has the lower ends 29a and 30a of its webs 25 and 26 seated upon the upper ends 27a and 28a of the webs 25 and 26 of the lower dispenser and the lower inter-engaging means 33 and 34 of the dispenser 10B are inter-engaged with the upper inter-engaging means 31 and 32 of the dispenser 10A.

On the side wall 12 are integral external eyes 35 and 36 which are of longitudinally elongated and transversely narrow rectangular shape; and on the side wall 13 are hooks 37 and 38 which are complementary to the eyes 35 and 36. Thus, two dispensers 10A or two dispensers 10B are stably interconnected side by side when the hooks 37 and 38 of one dispenser are engaged in the eyes 35 and 36 of the next adjacent dispenser.

In order that each dispenser which is in the position of a dispenser 10A may be stably supported upon a rack R, each of the dispensers is provided with a depending, transversely elongated rack-engaging foot 39 which is on the under side of the trough 23 and has a lower surface 39a which is coplanar with the lower surfaces 29a and 30a of the webs 25 and 26. The foot 39 is wide enough to rest upon several of the rack wires W, and is vertically short enough that the foot on an upper dispenser 10B does not interfere with removal of cans from the trough 23 of a lower dispenser 10A.

Stable support for the rear of the dispenser 10A is provided by panel means, indicated generally at 40, which normally occupies a non-interference position when a dispenser is in the position of an upper dispenser 10B.

In the illustrated preferred embodiment of the invention the entire dispenser 10 is fabricated from polypropylene of a well known and commercially available type which is sufficiently flexible and tough in thin sections that it may be formed into integral hinges; and the panel means 40 consists of a panel member 41 along the rear margin of which there is a transverse hinge 42 which is so formed. At the front of the panel member 41 is a lip 43; and the front-to-rear length of the panel member is such that when swung to a depending position the surface 43a of the lip 43 is coplanar with the lower ends 29a and 30a of the supporting webs 25 and 26 and serves to stably support the rear of the dispenser by resting upon several of the rack wires W. Small frangible tabs 44 connect the lateral margins of the panel member 41 with the inner margins 14a of the guides 14 to fix the panel member 41 in its non-interfering position in the plane of the guides 14. The tabs 44 are broken only if a dispenser is to be used as a bottom dispenser 10A of a stack.

In order that the panel member 41 may be secured in its depending, supporting position, it is provided with a pair of integral hooks 45 near its lateral margins, and when the panel member is moved into its depending supporting position the hooks 45 are engaged with detents 46 consisting of complementary openings in the rear guideway floor 21. The hooks 45 are short enough that when the panel member 41 is in its non-interfering position there is sufficient unobstructed space for the cans in the lower dispenser 10A.

The foregoing detailed description has been given for clearness of understanding only and no unnecessary limitations should be understood therefrom as modifications will be obvious to those skilled in the art.

I claim:

1. A stackable gravity feed can dispenser for a cooler which has racks formed of parallel wires extending from front to rear of the cooler, said dispenser comprising, in combination:

a downwardly and forwardly inclined guideway to support a series of cans for seriatim rolling movement from a filling end of the guideway at the rear of the cooler to a delivery end at the front of the cooler;

side walls defining the sides of the guideway, said side walls having integral upright supporting webs near the rear and the front which are thinner than the space between wires of a cooler rack, said webs having upper ends above the plane of the guideway which have upper interengaging means and lower ends below the plane of the guideway which have lower inter-engaging means complementary to said upper inter-engaging means, whereby two of said dispensers may be stacked with the webs of the upper of said two dispensers seated on the webs of the lower of said two dispensers and with said upper and lower means inter-engaged, and said webs leaving an unobstructed space for cans in the lower dispenser;

a depending, transversely elongated rack-engaging foot adjacent the front of the guideway, said foot being adapted to rest upon several of the rack wires to support the front of a lowermost dispenser stably on the rack and being vertically short enough to avoid interference with removal of cans when a dispenser is the upper of two dispensers;

and hinged panel means near the rear of the guideway, said panel means having a non-interference position entirely outside said unobstructed space and having a supporting position with a surface effectively coplanar with the lower ends of the supporting webs, said panel means having a transverse dimension greater than the span across several rack wires, whereby said panel means of a lowermost dispenser may occupy a supporting position resting stably upon a rack and the panel means of an upper dispenser may occupy the non-interference position.

2. The combination of claim 1 in which the panel means is hinged upon a transverse axis, the non-interference position is substantially in the plane of the bottom of the guideway, and the supporting position is substantially vertical.

3. The combination of claim 2 in which the guideway is a plastic molding, the hinged panel means has a hinge formed integrally with the bottom of the guideway, and integral frangible tabs connect the free end portion of the panel means to the guideway so as to hold said panel means normally in the non-interference position.

4. The combination of claim 3 in which the hinged panel means has integral latch fingers near its lateral margins, and integral latch elements on the bottom of the guideway are engaged by said latch fingers when the panel means is in supporting position.

5. The combination of claim 2 which includes latch fingers on the hinged panel means near its lateral margins and latch elements on the bottom of the guideway which are engaged by said latch fingers when the panel means is in supporting position.

6. The combination of claim 1 which includes integral external eyes on one side wall and integral external hooks on the other side wall, said hooks on one dispenser being engageable with said eyes on a laterally abutting dispenser to stably interconnect said dispensers side by side.

7. The combination of claim 6 in which the eyes are of longitudinally elongated and transversely narrow rectangular shape, and the hooks are complementary to the eyes.

8. The combination of claim 1 in which the guideway has stepped supporting surfaces along both sides which define guides at three levels and of three different widths to guide cans of different sizes.

9. A stackable gravity feed can dispenser for a cooler which has racks formed of parallel wires extending from front to rear of the cooler, said dispenser comprising, in combination:

a downwardly and forwardly inclined guideway to support a series of cans for seriatim rolling movement from a filling end of the guideway at the rear of the cooler to a delivery end at the front of the cooler;

side walls defining the sides of the guideway, said side walls having integral upright supporting webs near the rear and the front, said webs having upper ends above the plane of the guideway which have upper inter-engaging means and lower ends below the plane of the guideway which have lower inter-engaging means complementary to said upper inter-engaging means, whereby two of said dispensers may be stacked with the webs of the upper of said two dispensers seated on the webs of the lower of said two dispensers and with said upper and lower means inter-engaged, and said webs leaving both vertical and lateral clearance for cans in the lower dispenser;

and integral external eyes on one side wall and integral external hooks on the other side wall, said hooks on one dispenser being engageable with said eyes on a laterally adjacent dispenser to stably interconnect said dispensers side by side with their side walls abutting.

10. The combination of claim 9 in which the upright supporting webs are thinner than the space between wires of a cooler rack, and transversely extending means beneath the guideway for supporting a dispenser stably upon a cooler rack includes a fixed depending foot adjacent the front of the guideway and hinged panel means adjacent the rear of the guideway.

11. The combination of claim 10 in which the guideway has stepped supporting surfaces along both sides which define guides at three levels and of three different widths to guide cans of different sizes.

12. The combination of claim 9 in which the guideway has stepped supporting surfaces along both sides which define guides at three levels and of three different widths to guide cans of different sizes.

13. The combination of claim 9 in which the eyes on one side wall of the dispenser project laterally outwardly from said one side wall and are formed integrally therewith, and said hooks engage said eyes substantially vertically.

14. The combination of claim 13 in which the eyes are of longitudinally elongated and transversely narrow rectangular shape, and the hooks are complementary to the eyes.

* * * * *